(12) United States Patent
Van Den Berg

(10) Patent No.: US 10,788,155 B2
(45) Date of Patent: Sep. 29, 2020

(54) SEALING DEVICE FOR SEALING A LEAK IN A PIPE

(71) Applicant: Jan Dirk Johannes Van Den Berg, Welkom (ZA)

(72) Inventor: Jan Dirk Johannes Van Den Berg, Welkom (ZA)

(73) Assignee: Jan Dirk Johannes Van Den Berg, Welkom (ZA)

( * ) Notice: Subject to any disclaimer, the term of this patent is extended or adjusted under 35 U.S.C. 154(b) by 0 days.

(21) Appl. No.: 16/326,148

(22) PCT Filed: Aug. 16, 2017

(86) PCT No.: PCT/ZA2017/050042
§ 371 (c)(1),
(2) Date: Feb. 15, 2019

(87) PCT Pub. No.: WO2018/035545
PCT Pub. Date: Feb. 22, 2018

(65) Prior Publication Data
US 2019/0178432 A1 Jun. 13, 2019

(30) Foreign Application Priority Data

Aug. 16, 2016 (ZA) .................................. 2016/05651
Oct. 26, 2016 (ZA) .................................. 2016/07365

(51) Int. Cl.
| | | |
|---|---|---|
| *F16L 55/168* | (2006.01) | |
| *F16L 55/172* | (2006.01) | |
| *F16L 55/17* | (2006.01) | |
| *F16L 3/233* | (2006.01) | |

(52) U.S. Cl.
CPC .......... *F16L 55/1686* (2013.01); *F16L 55/17* (2013.01); *F16L 55/172* (2013.01); *F16L 3/2334* (2013.01); *F16L 55/168* (2013.01)

(58) Field of Classification Search
CPC ..... F16L 55/1686; F16L 55/17; F16L 55/172; F16L 3/2334
USPC ....................................................... 138/99, 97
See application file for complete search history.

(56) References Cited

U.S. PATENT DOCUMENTS

| | | | | |
|---|---|---|---|---|
| 4,585,091 | A * | 4/1986 | Budd ...................... | F01N 13/18 137/15.08 |
| 5,002,093 | A * | 3/1991 | Connolly, Jr. .......... | F16L 55/17 138/97 |
| 7,370,676 | B2 * | 5/2008 | d'3 Auria ............. | F16L 55/175 138/132 |
| 7,900,655 | B2 * | 3/2011 | Morton ................. | F16L 55/172 138/99 |

(Continued)

FOREIGN PATENT DOCUMENTS

FR 3006014 A1 * 11/2014 .......... F16L 55/1686

*Primary Examiner* — Patrick F Brinson
(74) *Attorney, Agent, or Firm* — MH2 Technology Law Group LLP

(57) ABSTRACT

A sealing device for sealing a leak in a pipe includes an elongate pipe wrapping member which is configured to be wrapped around and overlay a leak in a pipe in a wrapped condition a cover member for covering the pipe wrapping member substantially in the wrapped condition and a retaining arrangement for retaining the cover member and with it, the pipe wrapping member in position relative the pipe in a pipe sealing condition.

20 Claims, 24 Drawing Sheets

(56) References Cited

U.S. PATENT DOCUMENTS

| | | | | |
|---|---|---|---|---|
| 7,938,146 B2* | 5/2011 | Brooks | ............... | F16L 55/1683 |
| | | | | 138/97 |
| 8,141,592 B2* | 3/2012 | Rice | ...................... | F16L 55/175 |
| | | | | 138/97 |
| 8,522,827 B2* | 9/2013 | Lazzara | .................. | B29C 63/10 |
| | | | | 138/172 |
| 10,612,713 B2* | 4/2020 | Walker | ................ | F16L 55/1686 |

* cited by examiner

SEALING DEVICE FOR SEALING A LEAK IN A PIPE

CROSS-REFERENCE TO RELATED APPLICATIONS

This application is a national-stage entry of PCT/ZA2017/050042, which was filed on Aug. 16, 2017, and claims priority to South African Patent Application No. 2016/05651, which was filed on Aug. 16, 2016, and South African Patent Application No. 2016/07365, which was filed on Oct. 26, 2016. Each of these priority applications is incorporated herein by reference in its entirety.

FIELD OF THE INVENTION

This invention relates to a sealing device for sealing a leak in a pipe.

SUMMARY

According to the invention there is provided a sealing device for sealing a leak in a pipe which includes an elongate pipe wrapping member which is configured to be wrapped around and overlay a leak in a pipe in a wrapped condition, a cover member for covering the pipe wrapping member substantially in the wrapped condition, and a retaining arrangement for retaining the cover member and with it, the pipe wrapping member in position relative the pipe in a pipe sealing condition.

A connecting arrangement may be provided for allowing interconnection, preferably releasable, between the pipe wrapping member and the cover member. The connecting arrangement may include a receiving portion for receiving the pipe wrapping member complementally therein. The receiving portion may be sized, shaped and/or configured to allow displacement of the cover member relative the pipe wrapping member to facilitate substantial overlaying of the pipe wrapping member in the wrapped condition by the cover member. The receiving portion may be in the form of any suitable elongate pin, channel, slot, aperture, groove or recess defined in the cover member which is configured to receive and retain an end region of the pipe wrapping member complementally therein, typically so as to allow the receiving portion to be displaceable relative the pipe wrapping member. The elongate pin, channel, slot, aperture, groove or recess may extend substantially the length of the cover member. Alternatively, the elongate pin, channel, slot, aperture, groove or recess may be defined in an extension which may extend from the retaining arrangement.

The cover member may be generally arcuate and/or C-shaped along its length or in cross-section so as to correspond with the curvature of the pipe to be sealed or repaired. The cover member may be sized so as to allow it to overlay the pipe wrapping member in the wrapped condition, preferably having a width that allows a free end region of the cover member to overlay itself at least partially in the pipe sealing condition.

The retaining arrangement may be mounted on the cover member. The retaining arrangement may include a receiving formation for receiving the free end region of the cover member complementally therein. The receiving formation may be in the form of an aperture or slot which may be sized, shaped and/or configured to receive the free end region of the cover member therethrough. The retaining arrangement may further include a retaining formation for retaining the free end region of the cover member in position relative the receiving formation. The retaining formation may include a rack-and-ratchet assembly, typically being in the form of teeth which extend from the cover member and inwardly the receiving formation respectively. Alternatively, the retaining formation may be in the form of any suitable clamping assembly for clamping an overlaying free end region of the cover member relative itself in the pipe sealing condition.

The receiving formation may include a release mechanism for allowing the cover member to be released so as to be displaceable relative the receiving formation out of the pipe sealing condition.

A second retaining arrangement may be provided for assisting in retaining the overlaying free end region of the cover member in abutment with an overlaid portion of the cover member in the pipe sealing condition. Guides may be provided to allow the second retaining arrangement to be mounted displaceably on the cover member.

The retaining arrangements may be generally arcuate along their longitudinal and transverse axes in accordance with a curved profile defined by the pipe wrapping member in the wrapped condition. The receiving formations of the retaining arrangements may be generally arcuate in shape so as to correspond generally to the curvature of the retaining arrangements.

The pipe wrapping member may be manufactured from any suitable elastic material which may include any one or more of the group consisting of polyurethane, natural rubber, synthetic rubber and latex.

The cover member and retaining arrangements may be manufactured from any suitable plastic material which may include any one or more of the group including polypropylene, polycarbonate, polyethylene, silicone, nylon and polyvinyl chloride.

The retaining arrangements may be manufactured from a suitable metallic material.

A tightening means may be provided for tightening the cover member around the pipe wrapping member. The tightening means may include an aperture defined in the cover member for receiving an end region of a lever therethrough to allow a user to tighten the cover member in the pipe sealing condition.

DETAILED DESCRIPTION

Figure 1:
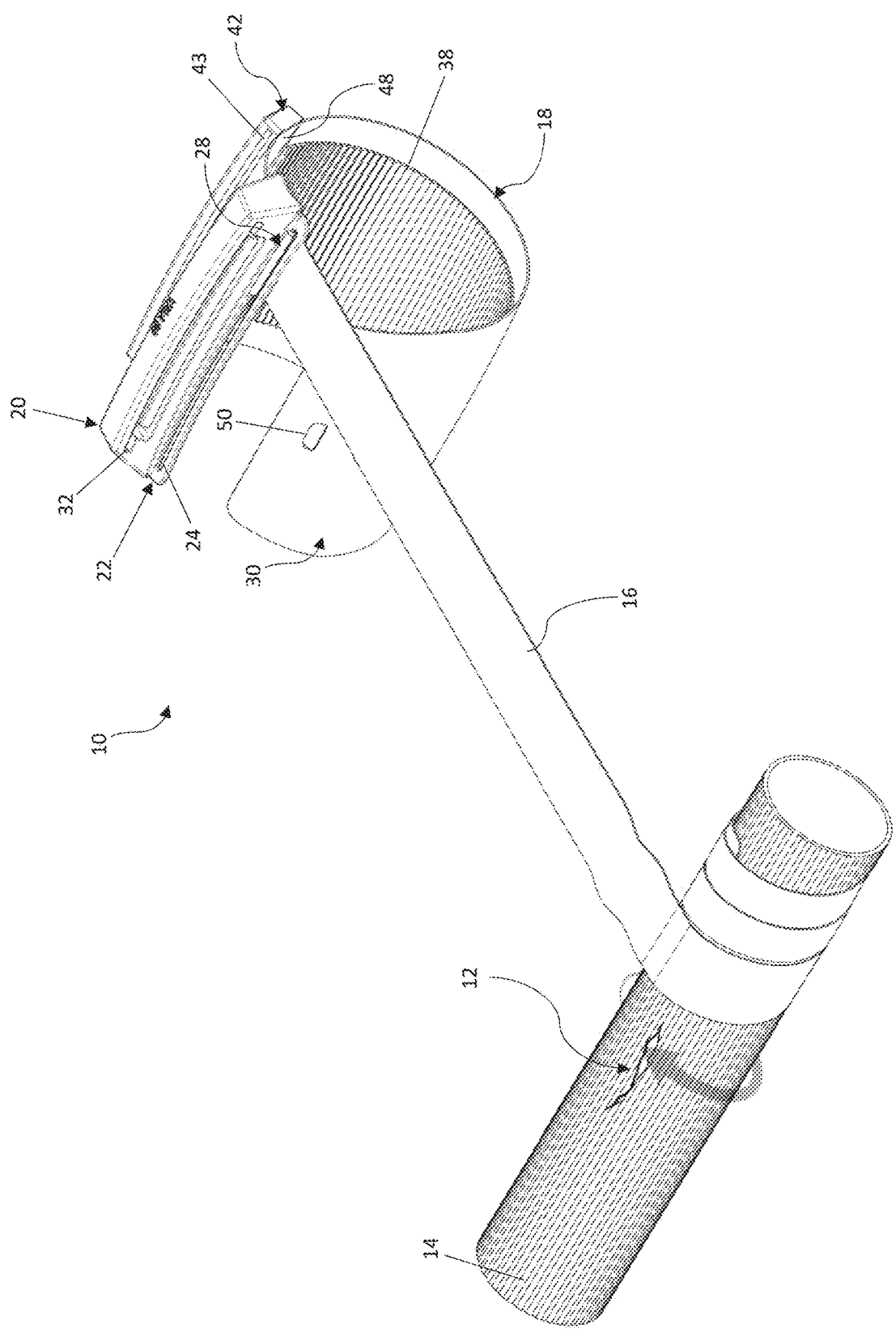
FIGS. 1, 2, 3, 4, 5, and 6 show perspective views of a first embodiment of a sealing device in accordance with the invention, through various stages of use.
Figure 2:
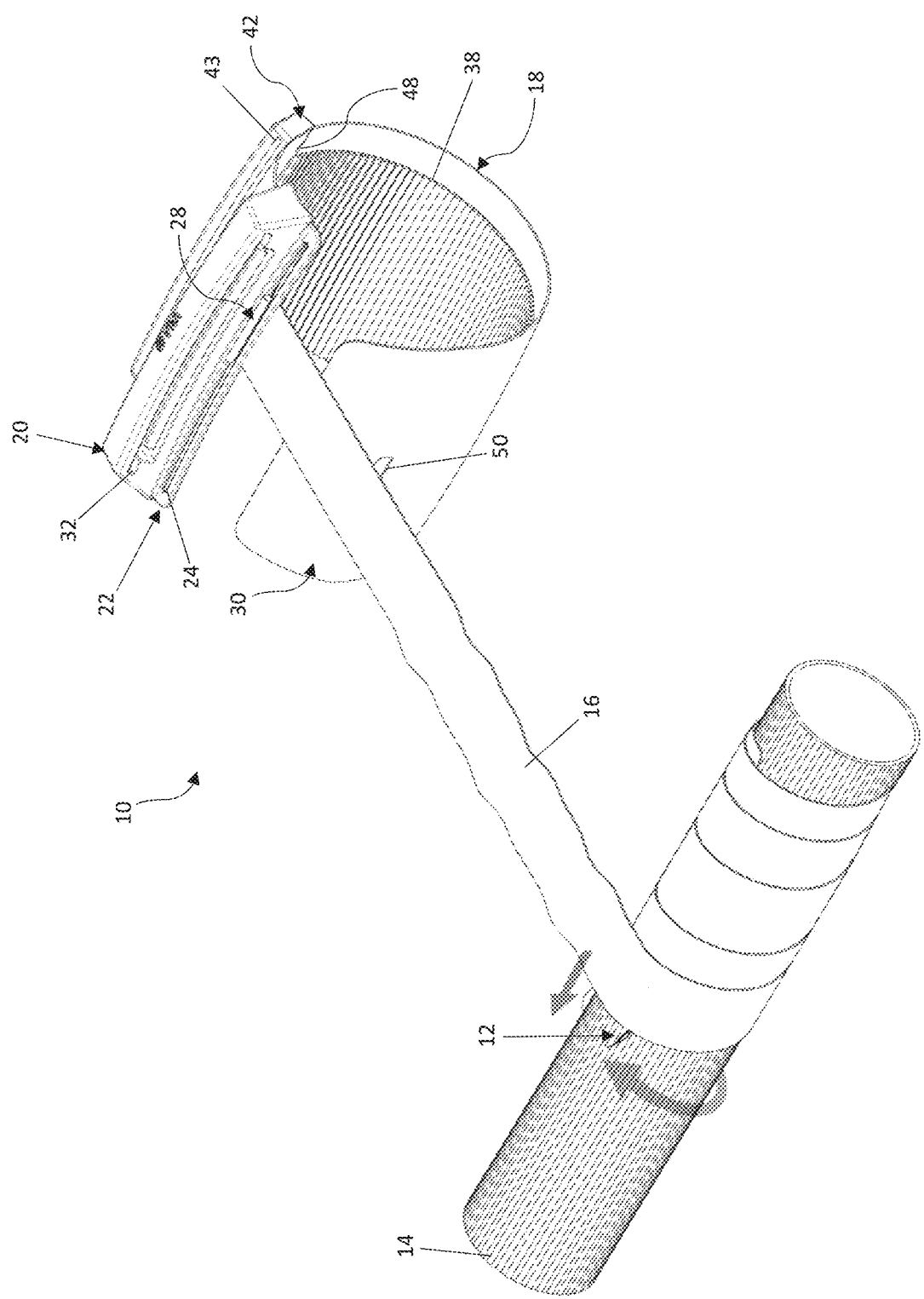
Figure 3:
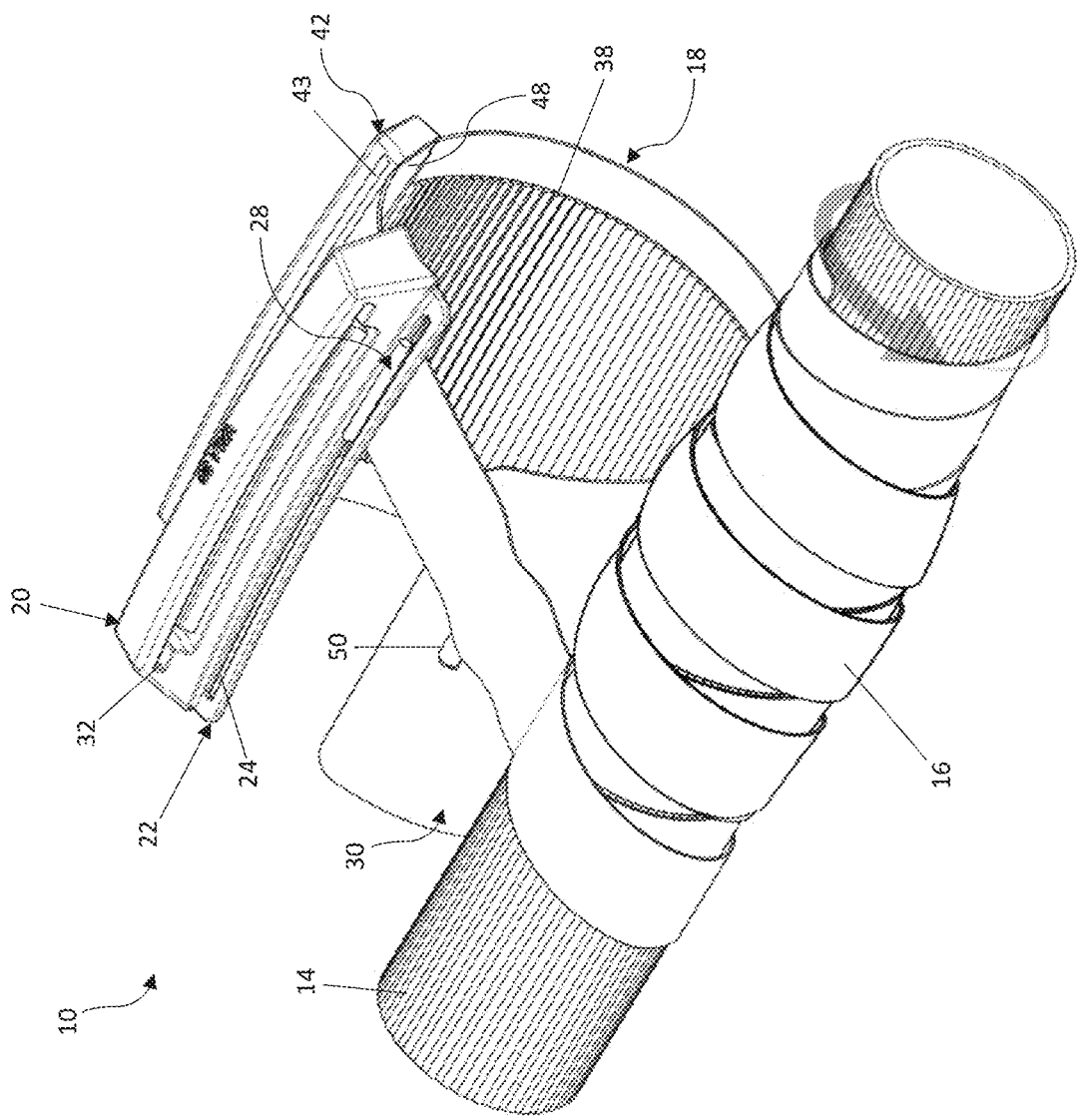
Figure 4:
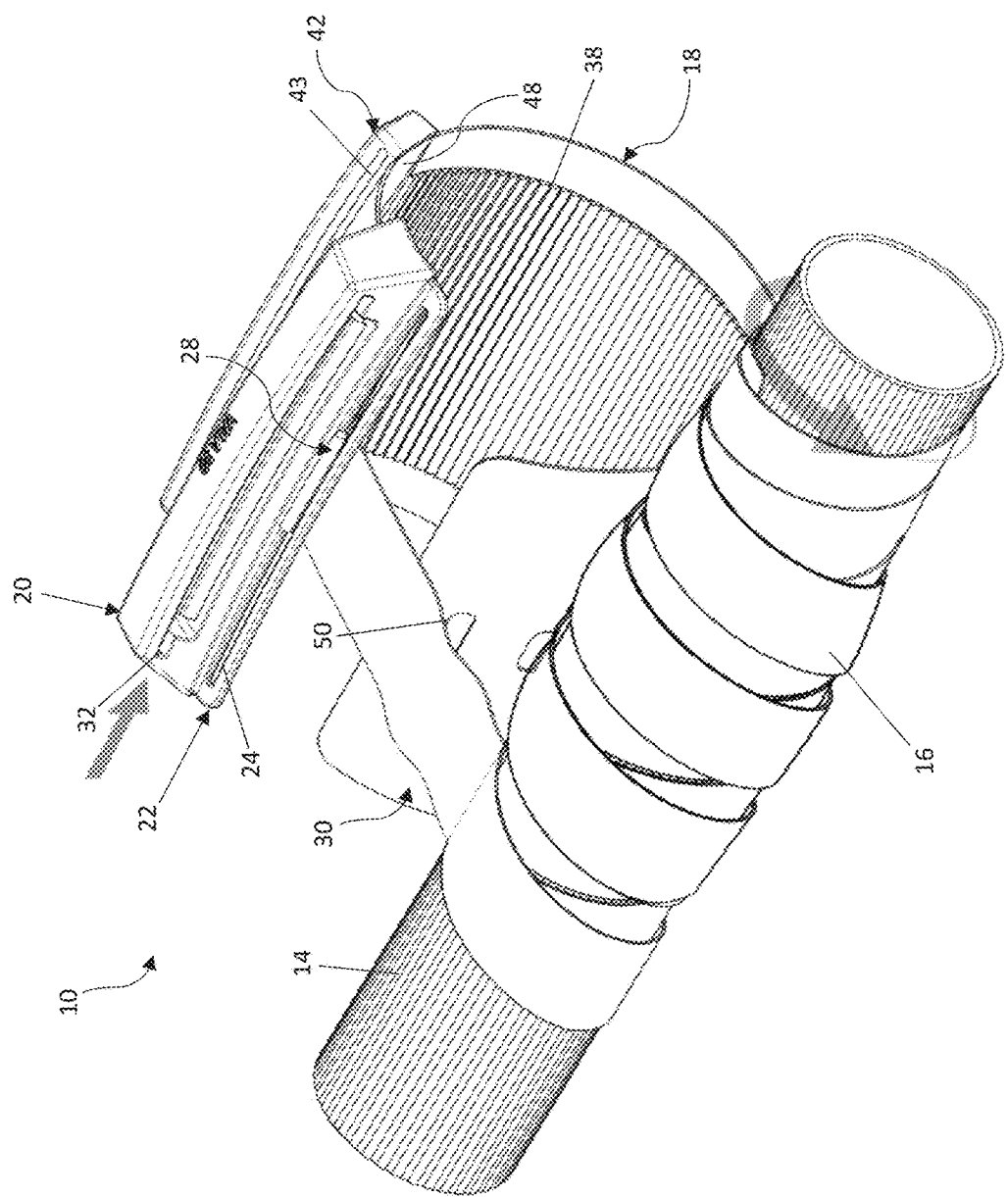

A sealing device for sealing a leak in a pipe in accordance with the invention will now be described by way of a non-limiting example, with reference to the accompanying drawings herebelow.

In a first embodiment of the invention, shown in FIGS. 1 to 7, reference numeral 10 refers generally to a sealing device for sealing a leak 12 in a pipe 14 in accordance with the present invention.

In this embodiment, the sealing device 10 includes an elongate pipe wrapping member 16 which is configured to be wrapped around and overlay the leak 12 in the pipe 14 in a wrapped condition, a cover member 18 for covering the pipe wrapping member 16 substantially in the wrapped condition and a retaining arrangement 20 for retaining the cover member 18 and with it, the pipe wrapping member 16 in position relative the pipe 14 in a pipe sealing condition.

A connecting arrangement 22 is provided for allowing releasable interconnection between the pipe wrapping member 16 and the cover member 18. The connecting arrangement 22 includes a receiving portion in the form of an elongate slot 24 for receiving the pipe wrapping member 16 complementally therethrough. The elongate slot 24 is sized, shaped and configured to allow displacement of the cover member 18 relative the pipe wrapping member 16 to facilitate substantial overlaying of the pipe wrapping member 16 in the wrapped condition by the cover member 18. The elongate slot 24 is configured to receive and retain an end region 28 of the pipe wrapping member 16 complementally therein. Typically, the elongate slot 24 extends substantially the length of the cover member 18.

The cover member 18 is generally arcuate or C-shaped along its length or in cross-section so as to correspond with the curvature of the pipe 14 to be sealed or repaired. The cover member 18 is sized so as to allow it to overlay the pipe wrapping member 16 in the wrapped condition, preferably having a width that allows a free end region 30 of the cover member 18 to overlay itself in the pipe sealing condition.

The retaining arrangement 20 is mounted on the cover member 18. The retaining arrangement 20 includes a receiving formation in the form of an aperture or elongate slot 32 for receiving the free end region 30 of the cover member 18 complementally therethrough. The retaining arrangement 20 further includes a retaining formation in the form of a rack-and-ratchet assembly 36 for retaining the free end region 30 of the cover member 18 in position relative the elongate slot 32. More particularly, the rack-and-ratchet assembly 36 includes teeth 38 and 39 which extend from the cover member 18 and inwardly the elongate slot 32 respectively.

A release mechanism 40 is provided for allowing the cover member 18 to be released and displaceable relative the elongate slot 32 in the pipe sealing condition.

A second retaining arrangement 42 is provided for assisting in retaining an overlaying free end region 44 of the cover member 18 in position relative an overlaid portion 46 of the cover member 18 in the pipe sealing condition and which includes an elongate slot 43 similar to elongate slot 32. Guides 48 are provided to allow the second retaining arrangement 42 to be mounted displaceably on the cover member 18.

The retaining arrangements 20 and 42 are generally arcuate along their longitudinal and transverse lengths to correspond generally to the curve of the pipe wrapping member 16 in the wrapped condition. The elongate slots 32 and 43 of the retaining arrangements 20 and 42 are generally arcuate in shape along their length so as to correspond generally to the curvature of the retaining arrangements 20 and 42.

A tightening means in the form of a plurality of tightening apertures 50 are provided for facilitating tightening of the cover member 18 around the pipe wrapping member 16 in the pipe sealing condition. The tightening apertures 50 are defined in the cover member 18 for receiving an end region 52 of a lever 54 therethrough to allow a user to tighten the cover member 18 in the pipe sealing condition.

Figure 5:
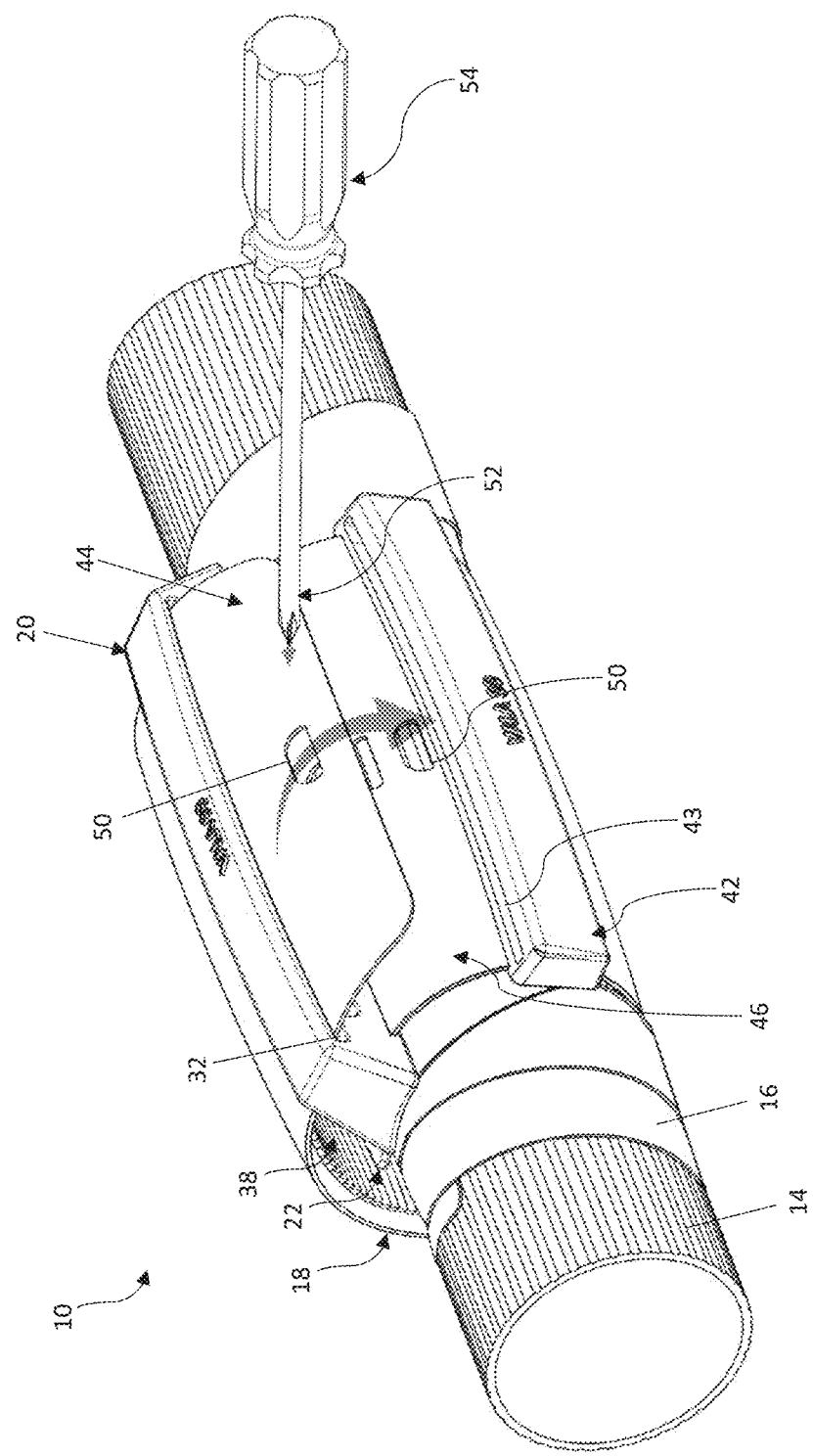
Figure 6:
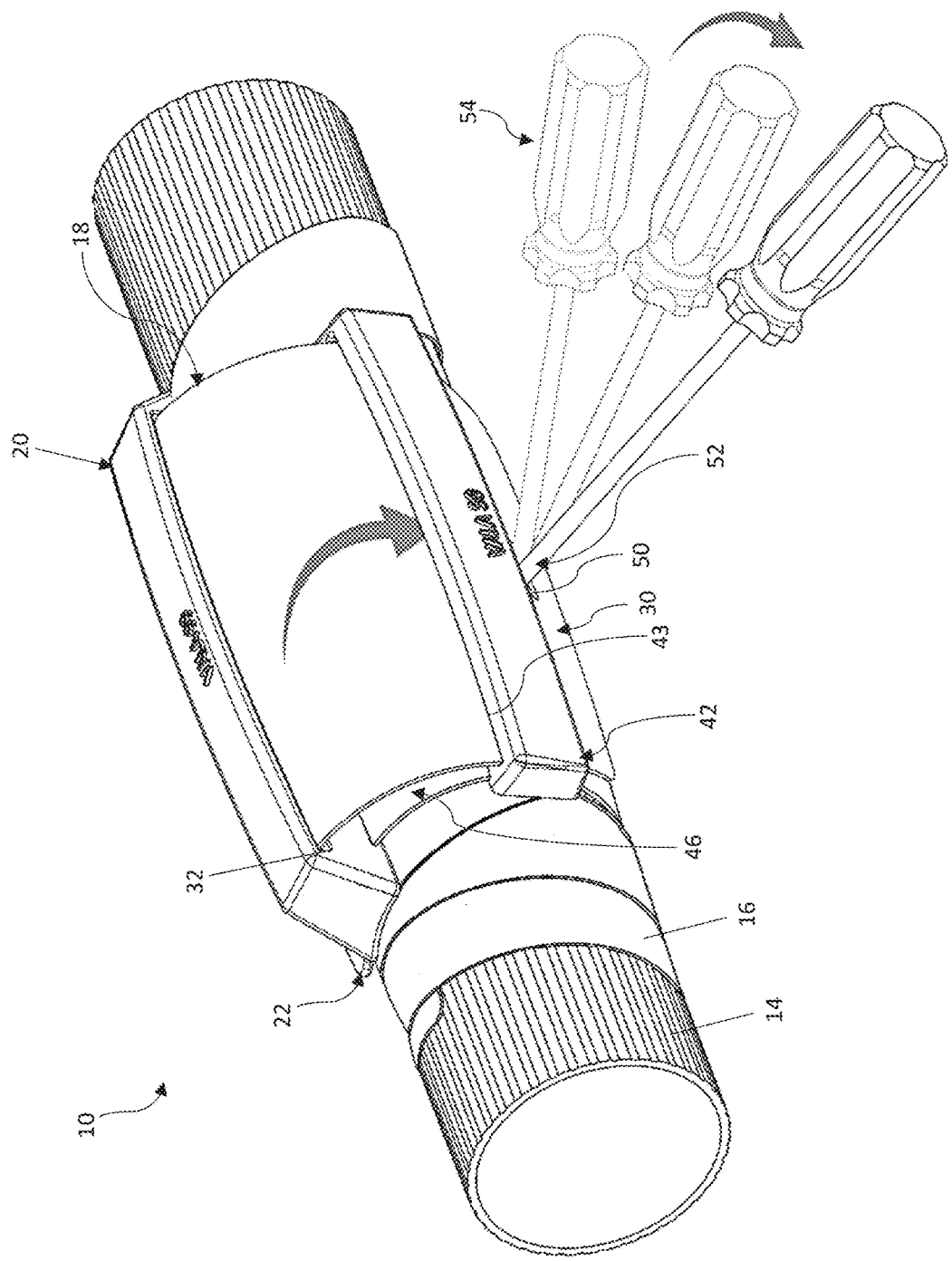
Figure 7:
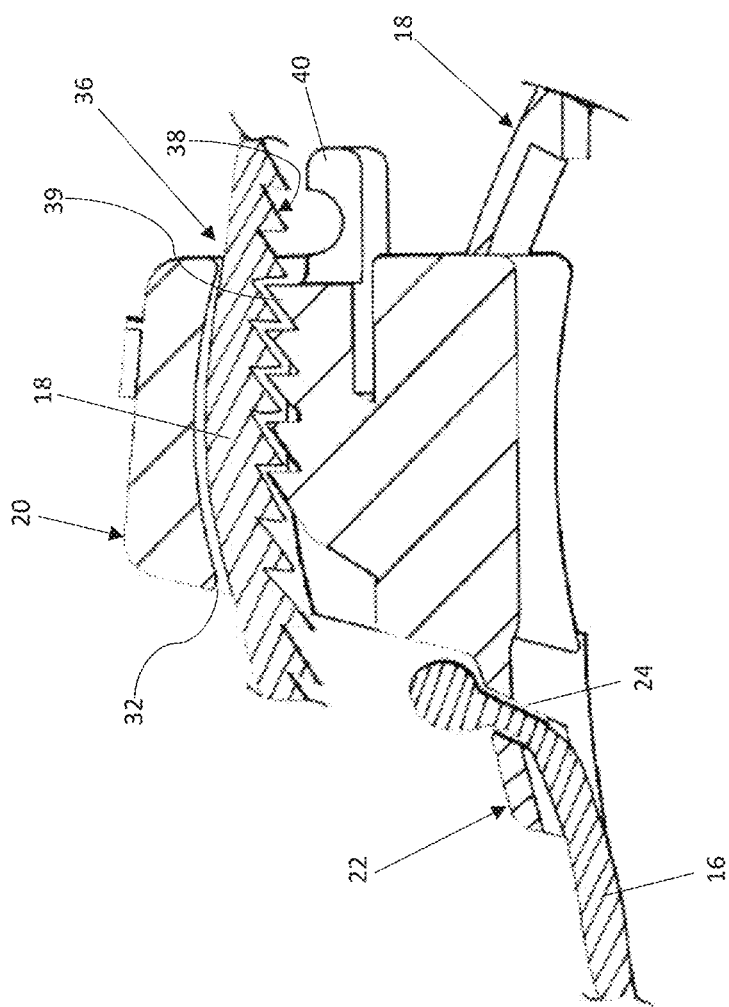
FIG. 7 shows a sectioned side view of a portion of the sealing device shown in FIG. 5.

In use, and as shown in FIGS. 1 to 4, a user wraps the pipe wrapping member 16 around the leak 12 in the pipe 14 and then proceeds to align the cover member 18 and the pipe wrapping member 16 to allow the cover member 18 to substantially overlay the pipe wrapping member 16. As shown in FIGS. 5 to 7, the user then feeds the free end region 30 of the cover member 18 through the elongate slot 32 of the retaining arrangement 20 so as to overlay the free end region 30 of the cover member 18 over itself and to allow complementary retaining engagement of the teeth 38 and 39 so as to retain the free end region 30 of the cover member 18 in position relative the elongate slot 32. As shown in FIG. 6, the user then continues to tighten the cover member 18 over itself and feeds the overlaying free end region 44 into and through the elongate slot 43 of the second retaining arrangement 42 so as to overlay the free end region 30 of the cover member 18 over itself and to allow complementary retaining engagement of the teeth 38 and teeth (not shown) defined in the second retaining arrangement 42 so as to retain the free end region 30 of the cover member 18 in position relative the elongate slot 32. Additionally, the second retaining arrangement 42 allows a user to retain the free end region 30 in substantial abutment with the overlaid portion 46 of the cover member 18.

The teeth (not shown) of the second retaining arrangement 42 then engage the teeth 38 overlaying free end region 44 of the cover member 18 and the guides 48 allow the user to slide the second retaining arrangement 42 along the cover member 18 thereby pulling the overlaying free end region 44 and tightening the cover member 18 on the pipe wrapping member 16 in the pipe sealing condition.

Figure 8:
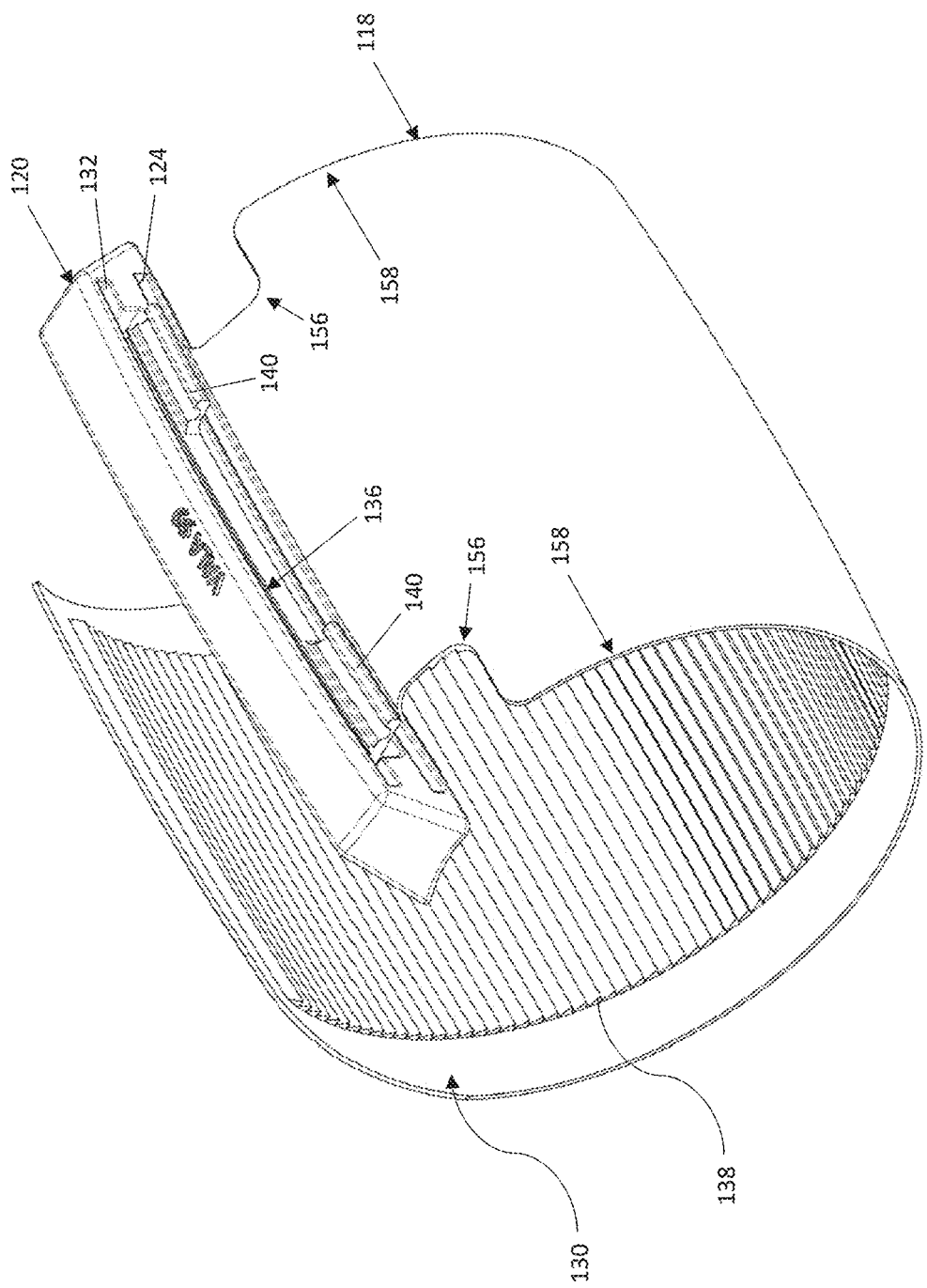
FIG. 8 shows a perspective view of a second embodiment of a sealing device in accordance with the invention.
Figure 9:
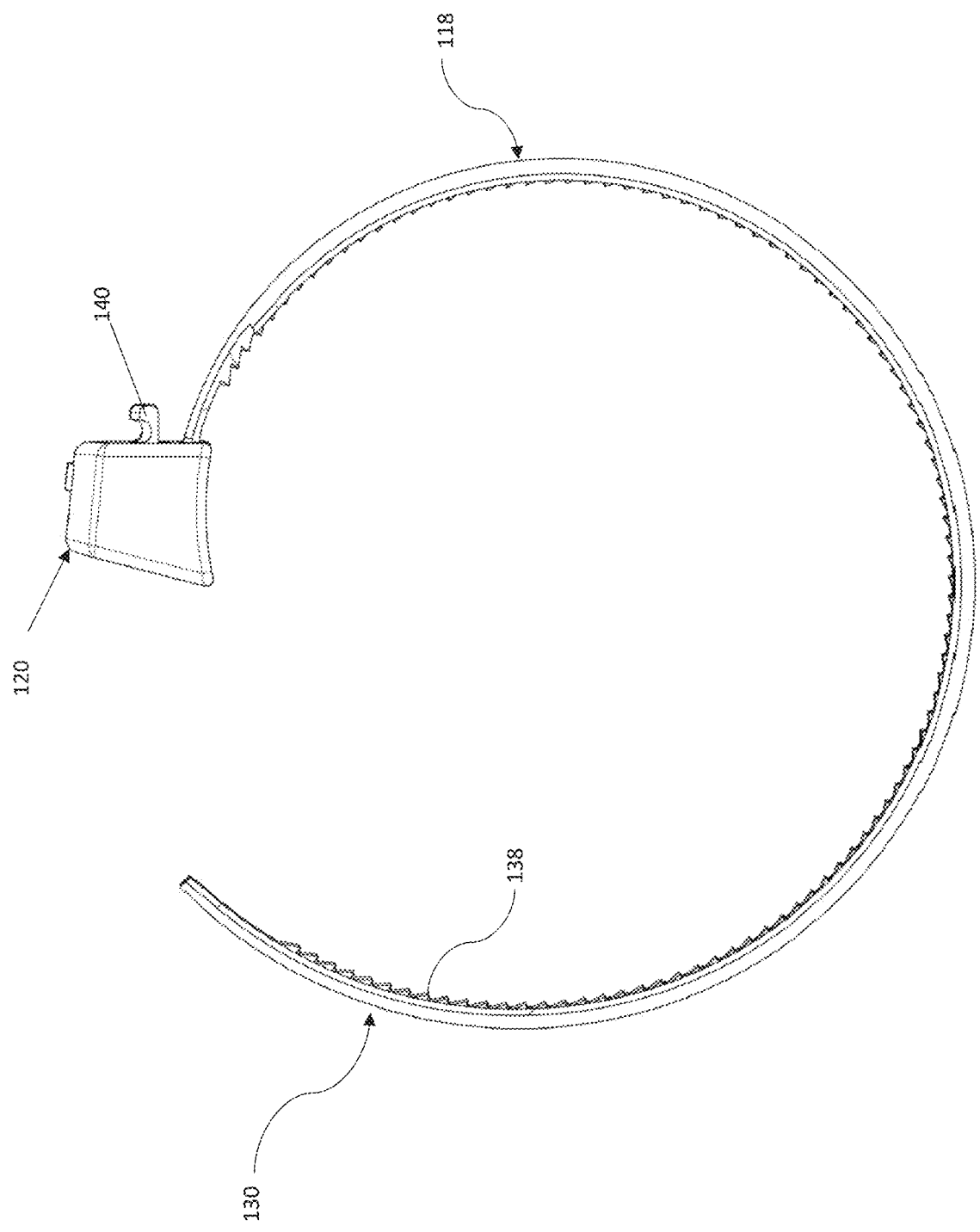
FIG. 9 shows a side view of the sealing device shown in FIG. 8.
Figure 10:
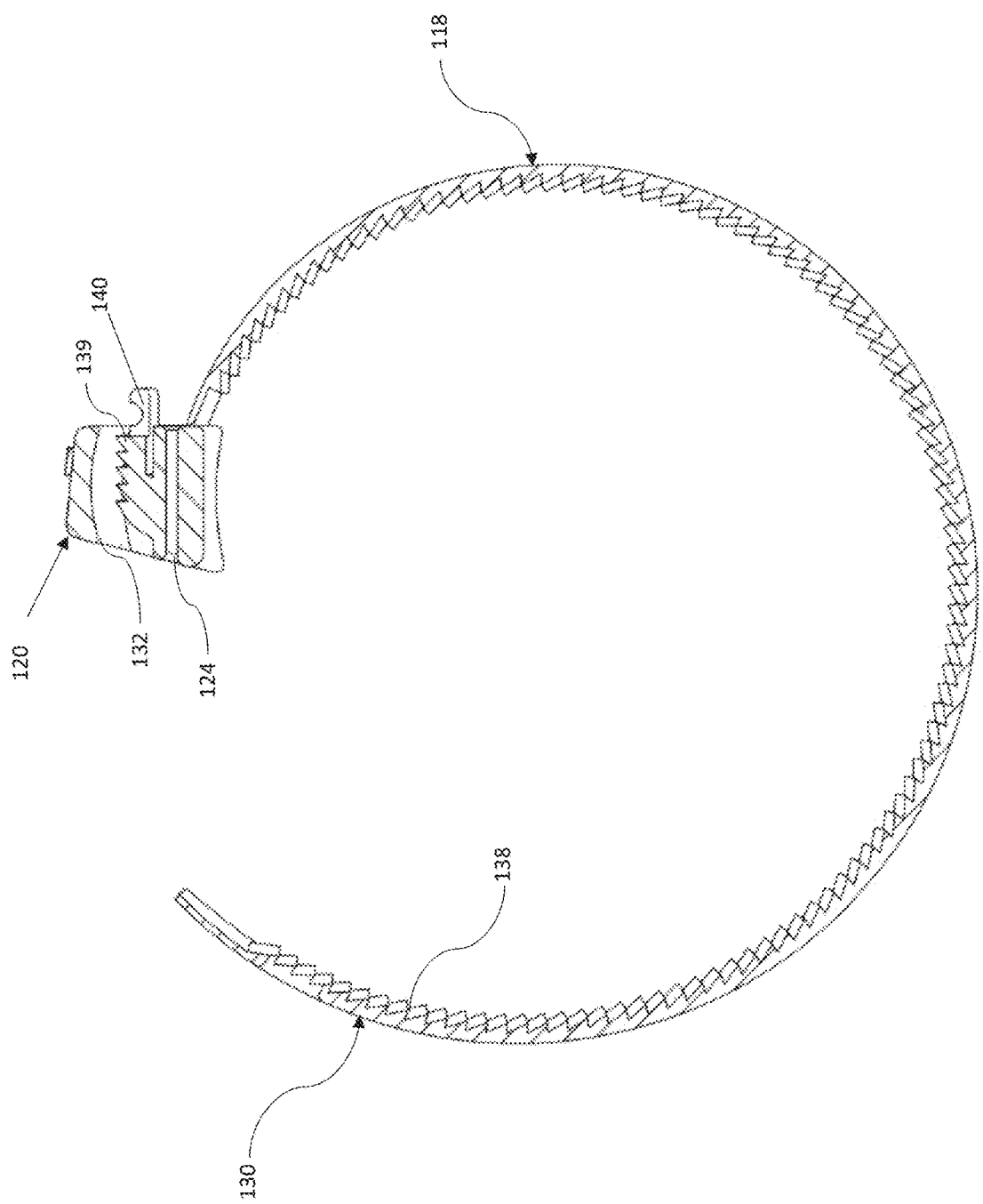
FIG. 10 shows a sectioned side view of the sealing device shown in FIGS. 8 and 9.
Figure 11:
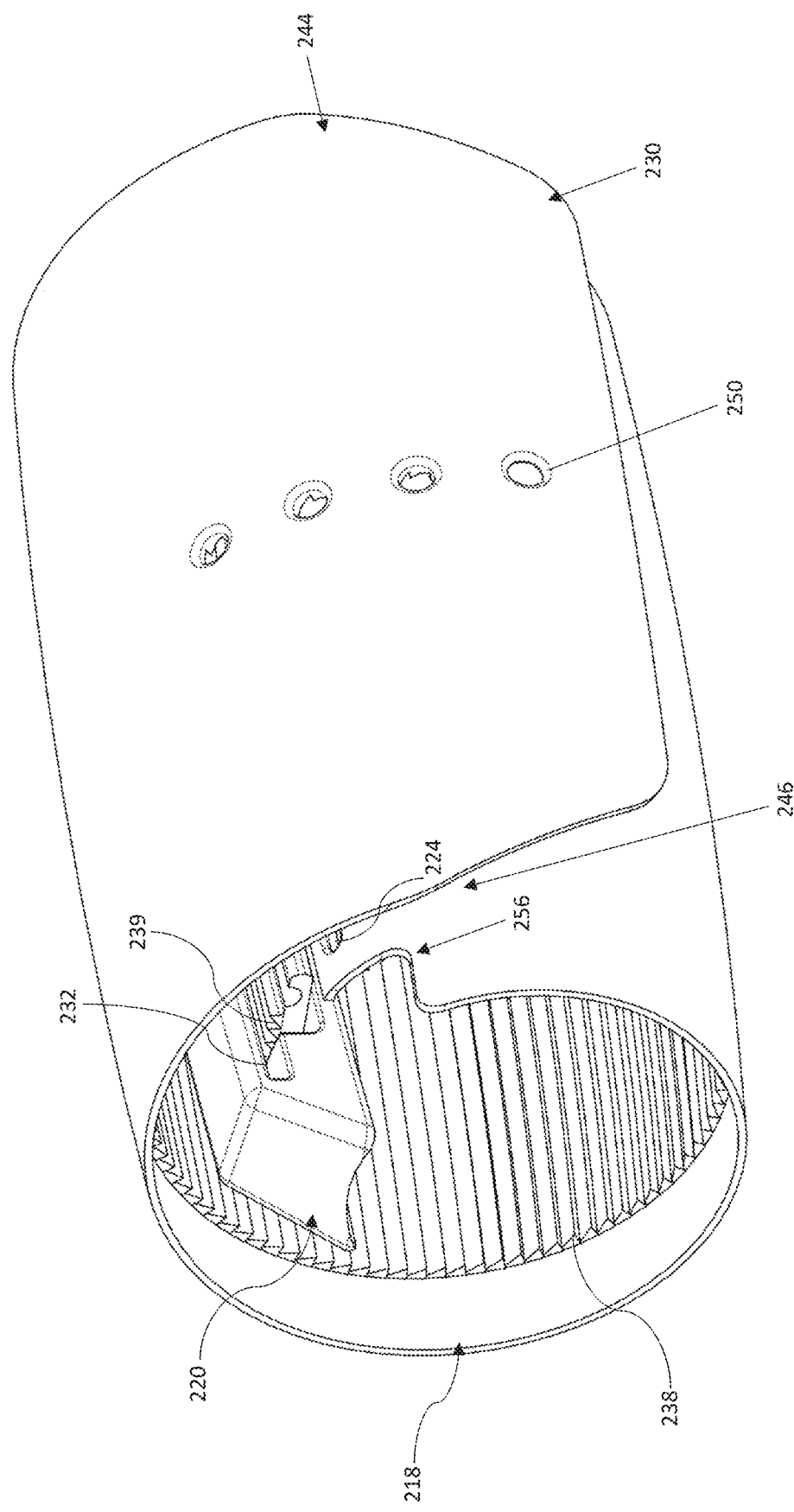
FIG. 11 shows a perspective view of a third embodiment of a sealing device in accordance with the invention.
Figure 12:
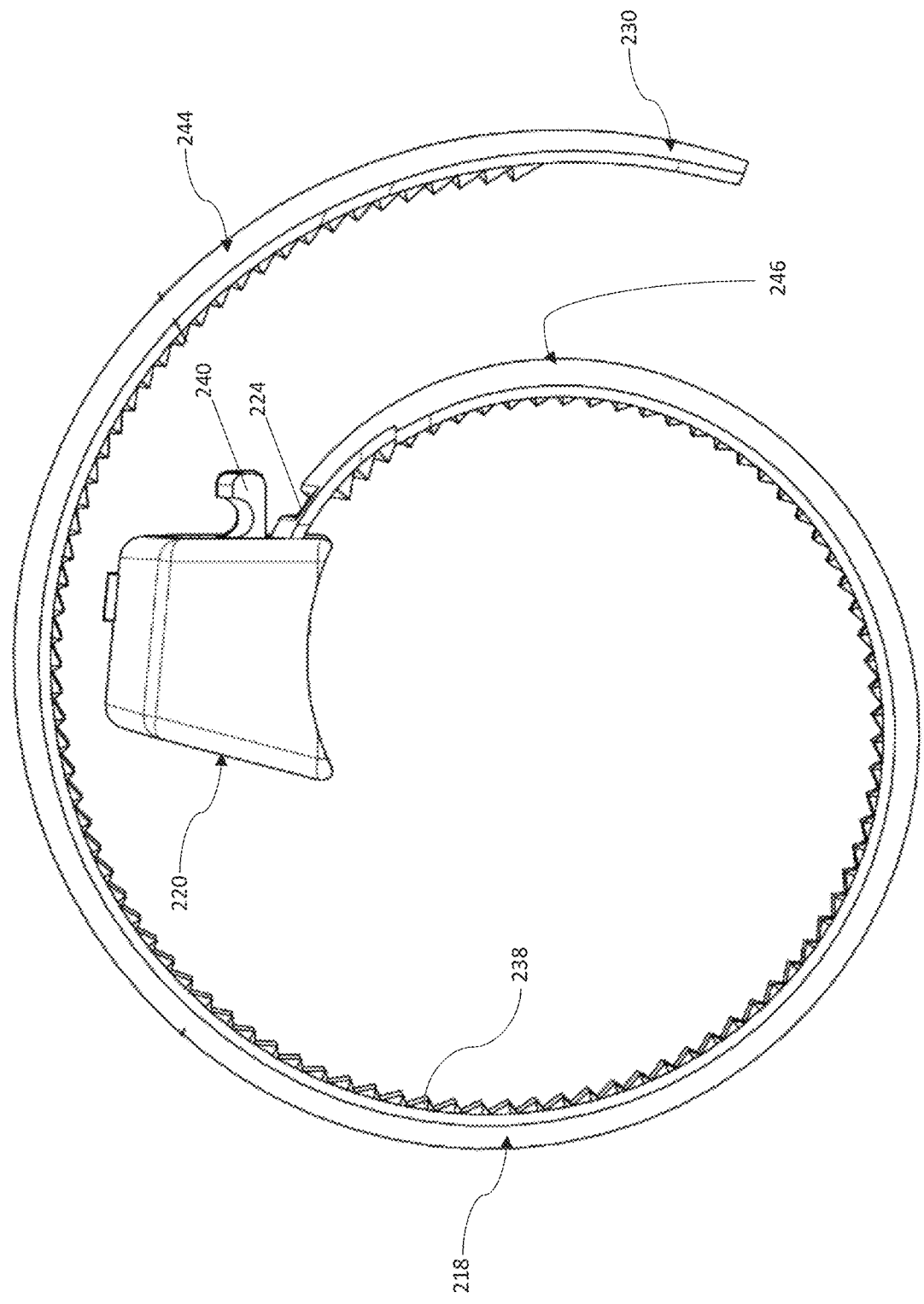
FIG. 12 shows a side view of the sealing device shown in FIG. 11.
Figure 13:
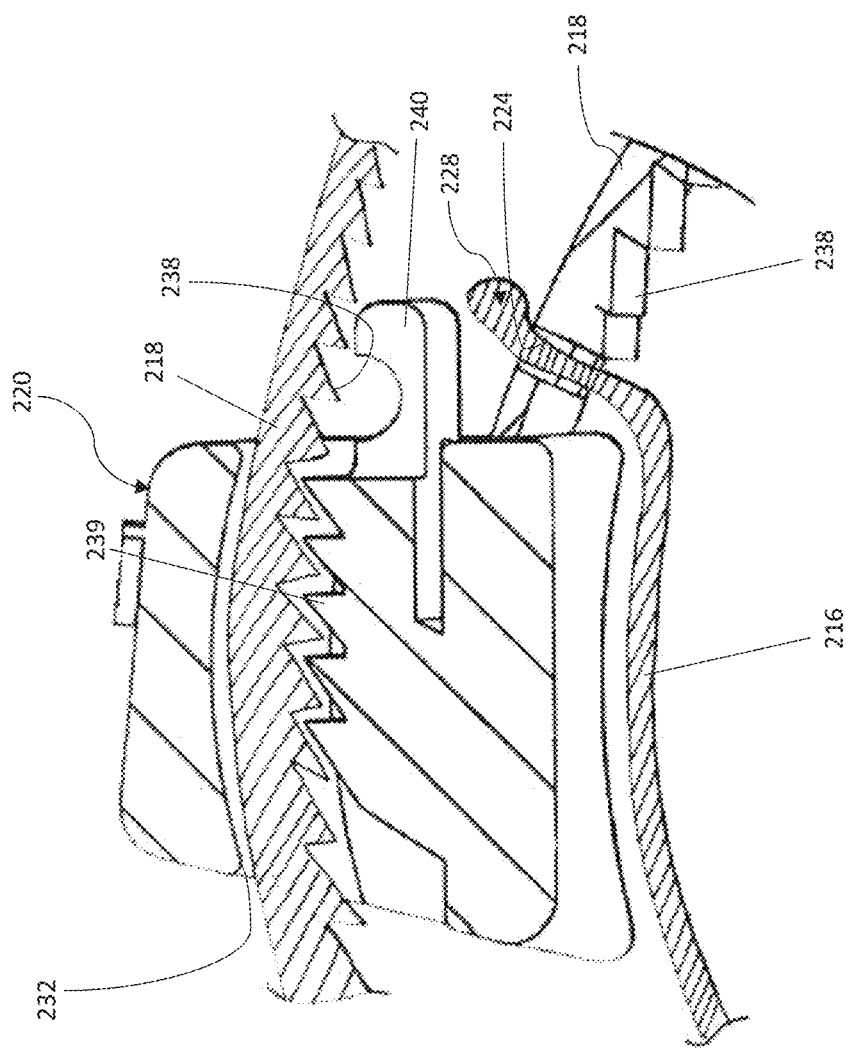
FIG. 13 shows a sectioned side view of a portion of the sealing device shown in FIGS. 11 and 12.
Figure 14:
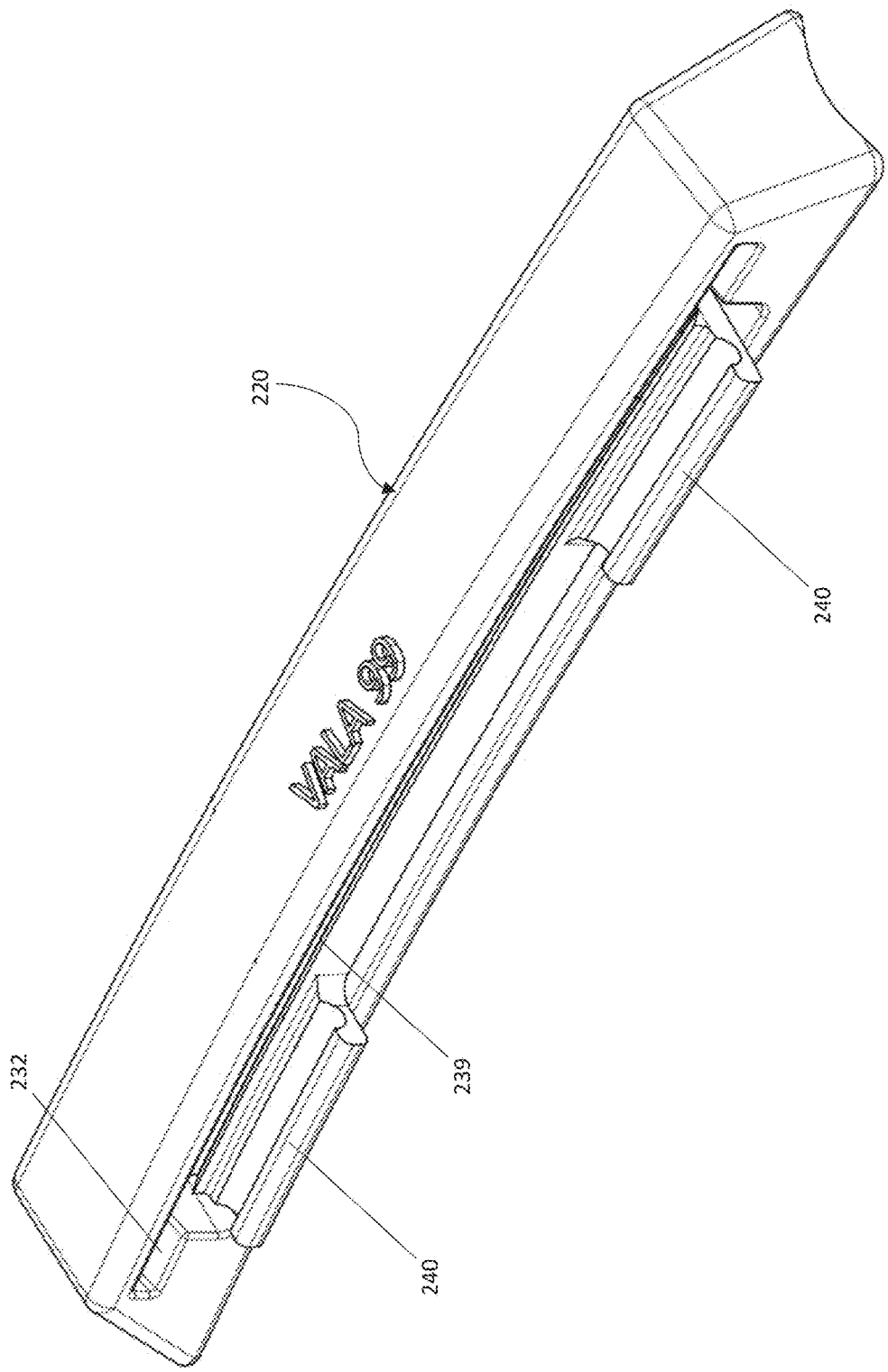
FIGS. 14 and 15 show enlarged perspective and front views of a portion of the sealing device shown in FIGS. 11 to 13.
Figure 15:
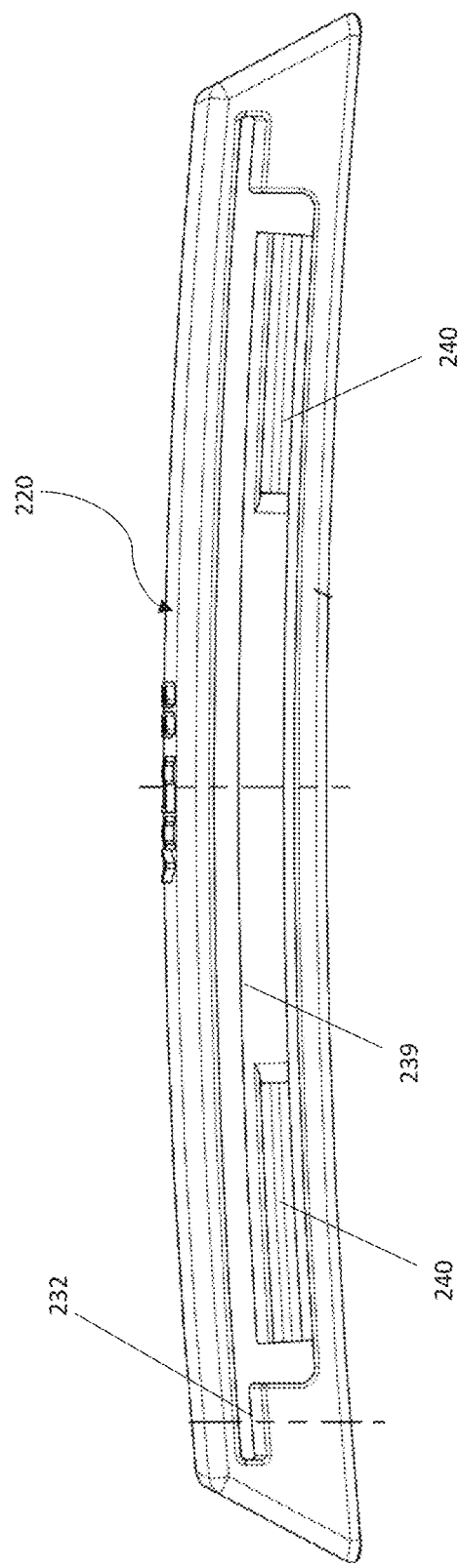

Referring now to a second embodiment of the invention, as shown in FIGS. 8 to 10, reference numerals 118 and 120 refer generally to a cover member and a retaining arrangement of a sealing device in accordance with the invention. In this embodiment, an elongate slot 124 is defined in the retaining arrangement 120 substantially parallel an elongate slot or aperture 132.

Shoulders 156 are defined in the cover member 118 at opposing transverse end regions 158 thereof for allowing guides (not shown) of the second retaining arrangement (not shown) to be received therein and slide onto the cover member 118.

Referring now to a third embodiment of the invention, as shown in FIGS. 11 to 15, reference numeral 218 and 220 refer generally to a cover member and a retaining arrangement a sealing device in accordance with the invention. In this embodiment, an elongate slot 224 is defined in the cover member 218 and extends substantially the length of an overlaid portion 246 thereof.

Figure 16:
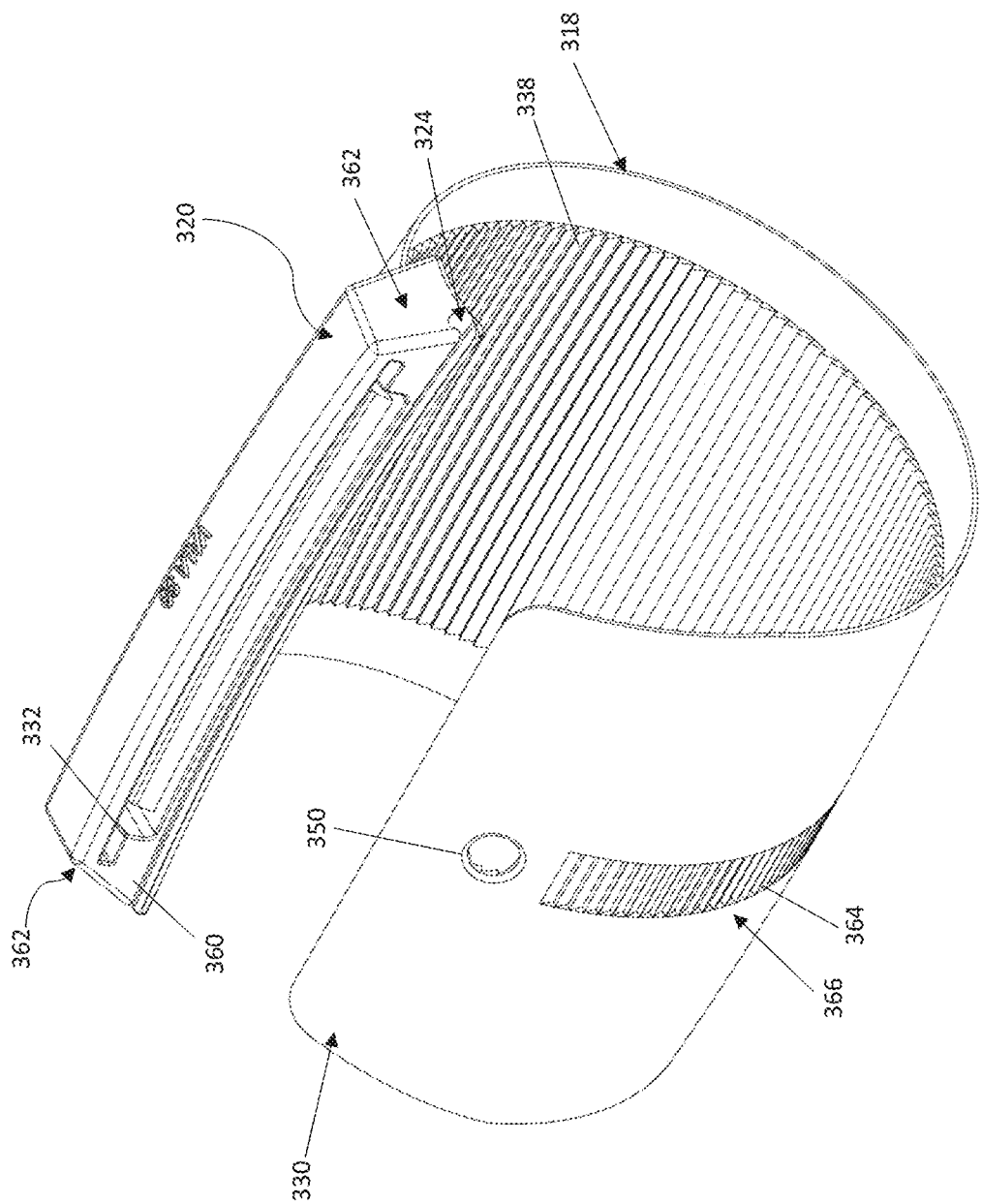
FIGS. 16 and 17 show perspective views of a fourth embodiment of the sealing device in accordance with the invention.
Figure 17:
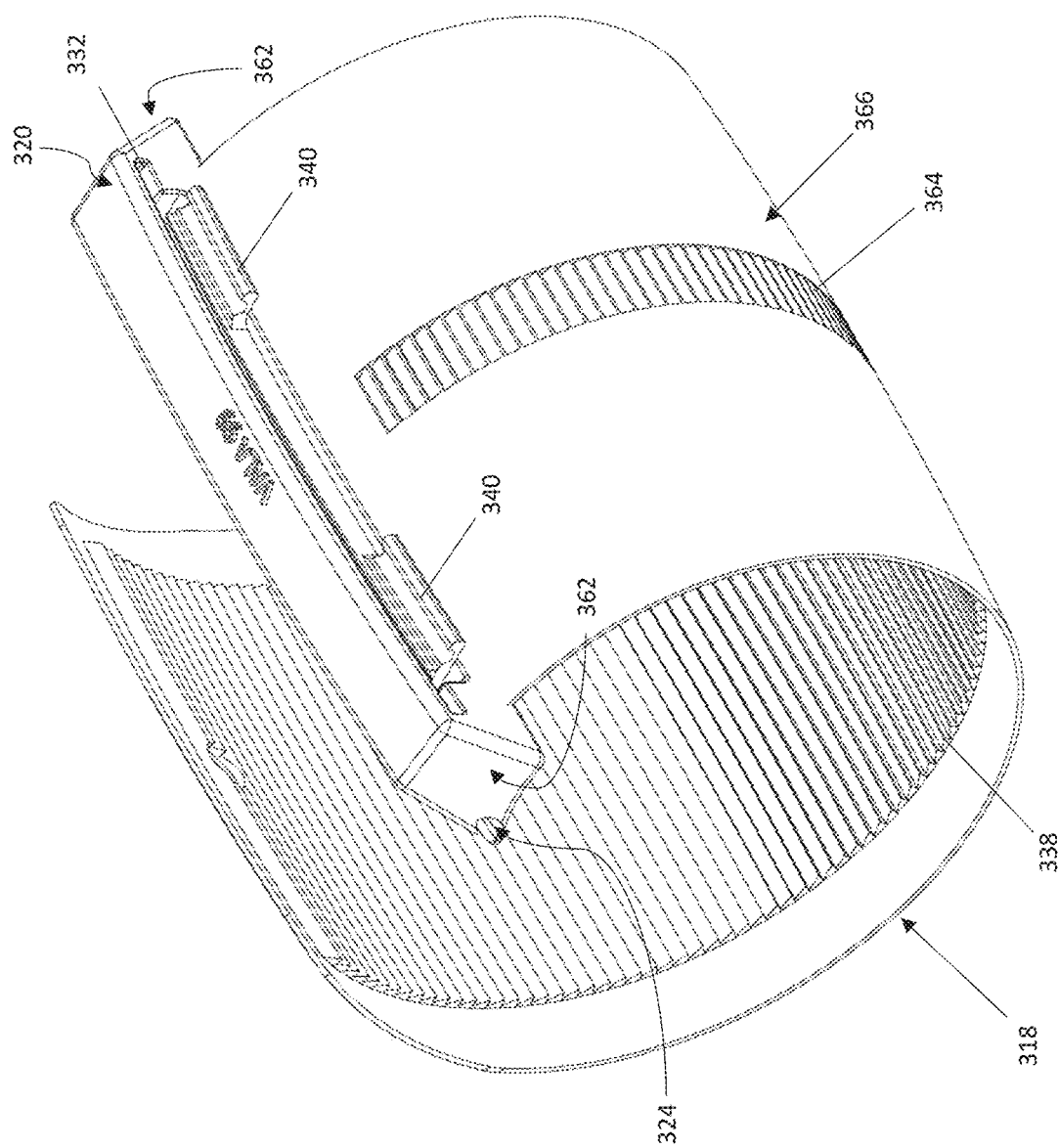
Figure 18:
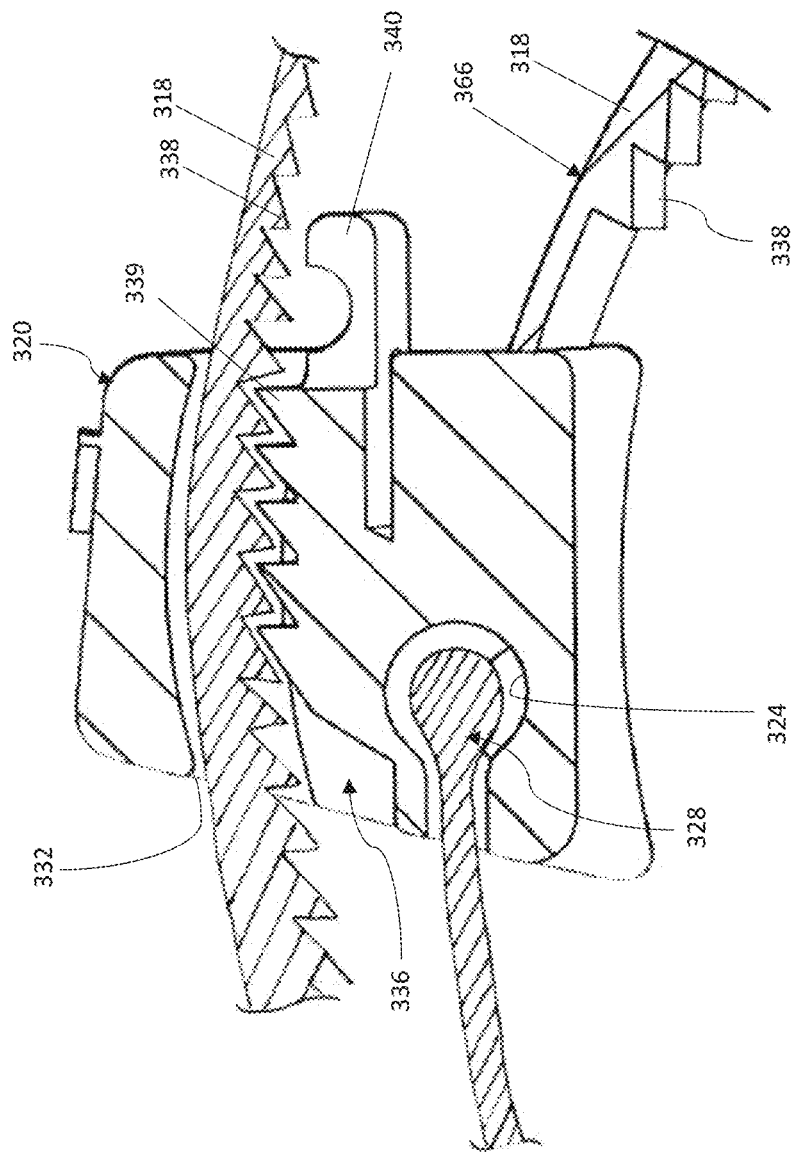
FIG. 18 shows a sectioned side view of a portion of the sealing device shown in FIGS. 16 and 17.

Referring now to a fourth embodiment of the invention, as shown in FIGS. 16 to 18, reference numeral 318 and 320 refer generally to a cover member and a retaining arrangement of a sealing device in accordance with the invention. In this embodiment, an elongate slot 324 of the connecting arrangement 322 is defined in a wall 360 of the retaining arrangement 320 along the length thereof. The elongate slot 324 extends between opposing transverse end walls 362 of the retaining arrangement 320. The elongate slot 324 is substantially bulbous-shaped in cross-section so as to receive and retain an end region 328 of a pipe wrapping member 316 therein.

Teeth 364 are defined on an outer region 366 of the cover member 318 to engage with teeth (not shown) in a second retaining arrangement 342 to further assist with tightening of the cover member 318 over the pipe wrapping member 316.

Figure 19:
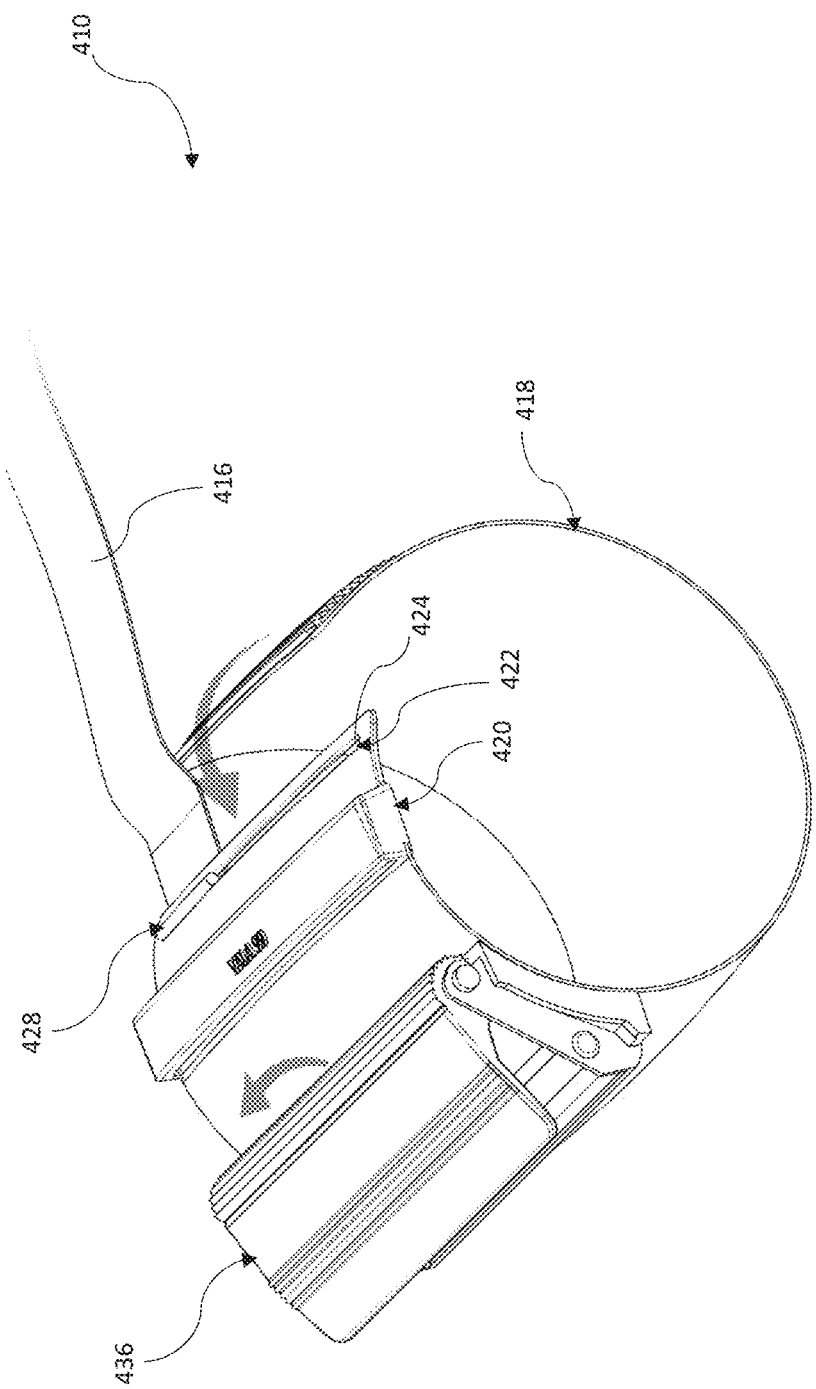
FIGS. 19, 20, 21, 22, 23, and 24 show further embodiments of the sealing device in accordance with the invention.

Referring now to a fifth embodiment of the invention, as shown in FIG. 19, reference numeral 410 refers generally to sealing device in accordance with the invention. In this embodiment, a second retaining arrangement is in the form of a rack-and-ratchet assembly 436 which extends along the length of a cover member 418.

Figure 20:
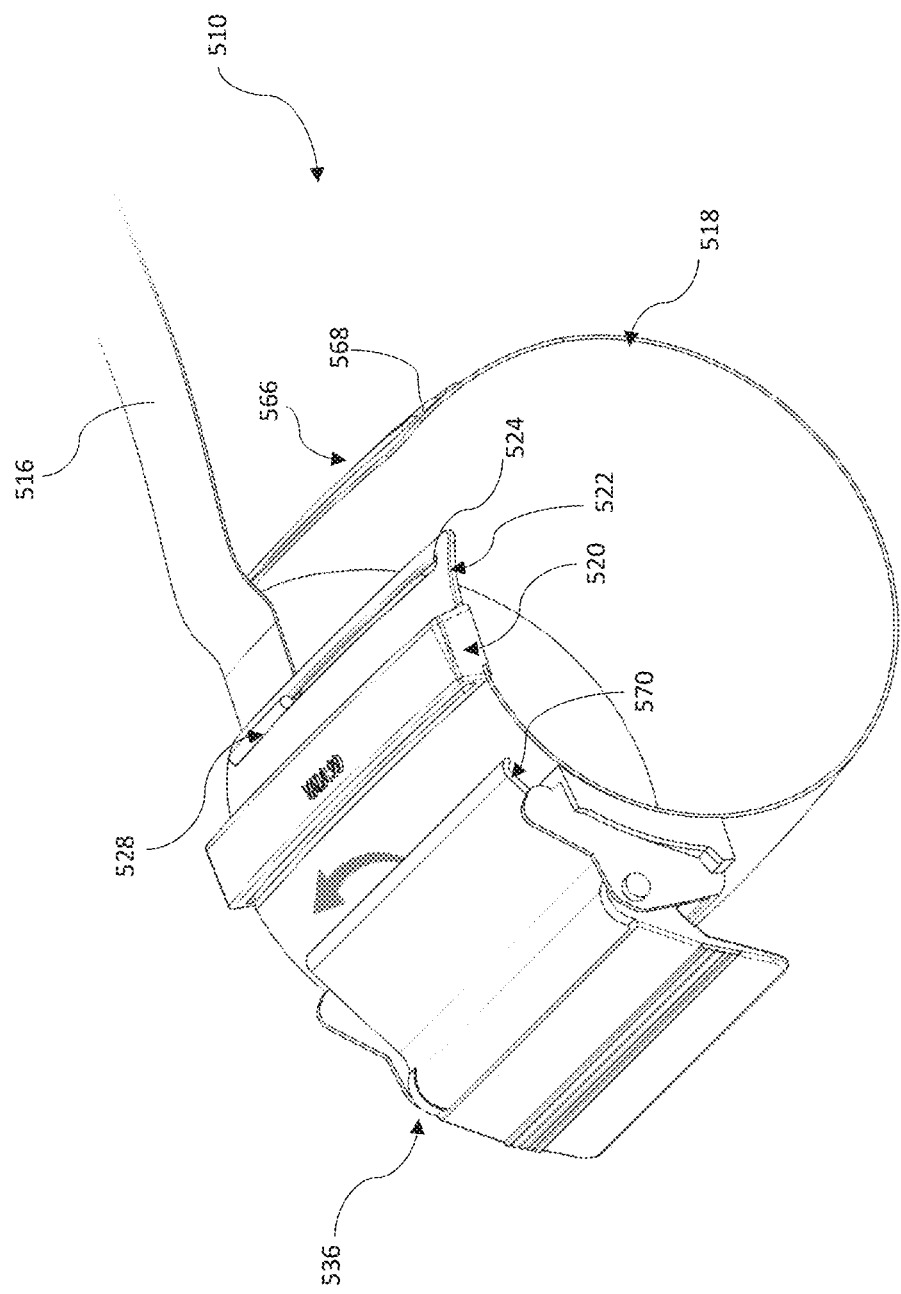

Referring now to a sixth embodiment of the invention, as shown in FIG. 20, reference numeral 510 refers generally to sealing device in accordance with the invention. In this embodiment, a second retaining arrangement is in the form of a rack-and-ratchet assembly 536 which extends along the length of a cover member 518 and includes ridges 568 defined on an outer region 566 of the cover member 518 which engage complementally and releasably with a ridge engaging portion 568 of the rack-and-ratchet assembly 536.

Figure 21:
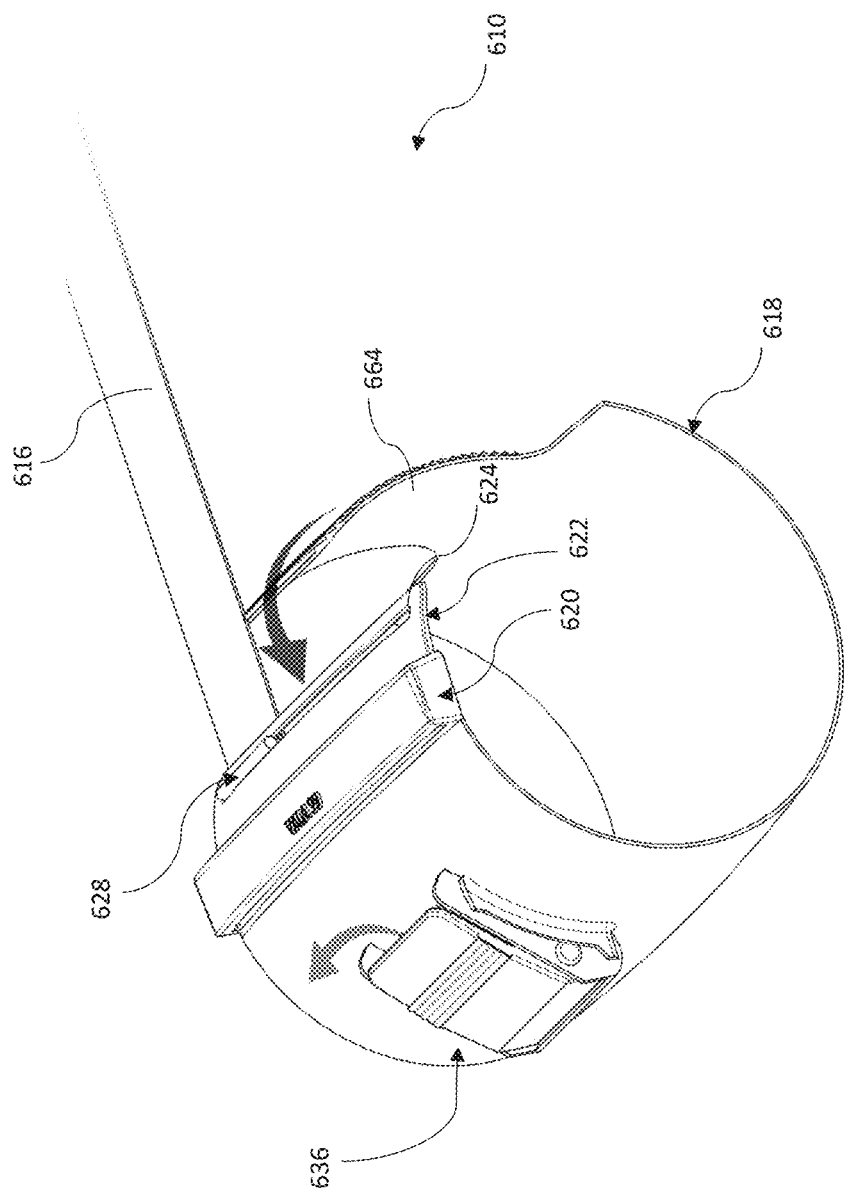

Referring now to a seventh embodiment of the invention, as shown in FIG. 21, reference numeral 610 refers generally to sealing device in accordance with the invention. In this embodiment, a second retaining arrangement is in the form of a rack-and-ratchet assembly 636 which is located substantially centrally a cover member 618 and has a width smaller than the length of the cover member 618.

Figure 22:
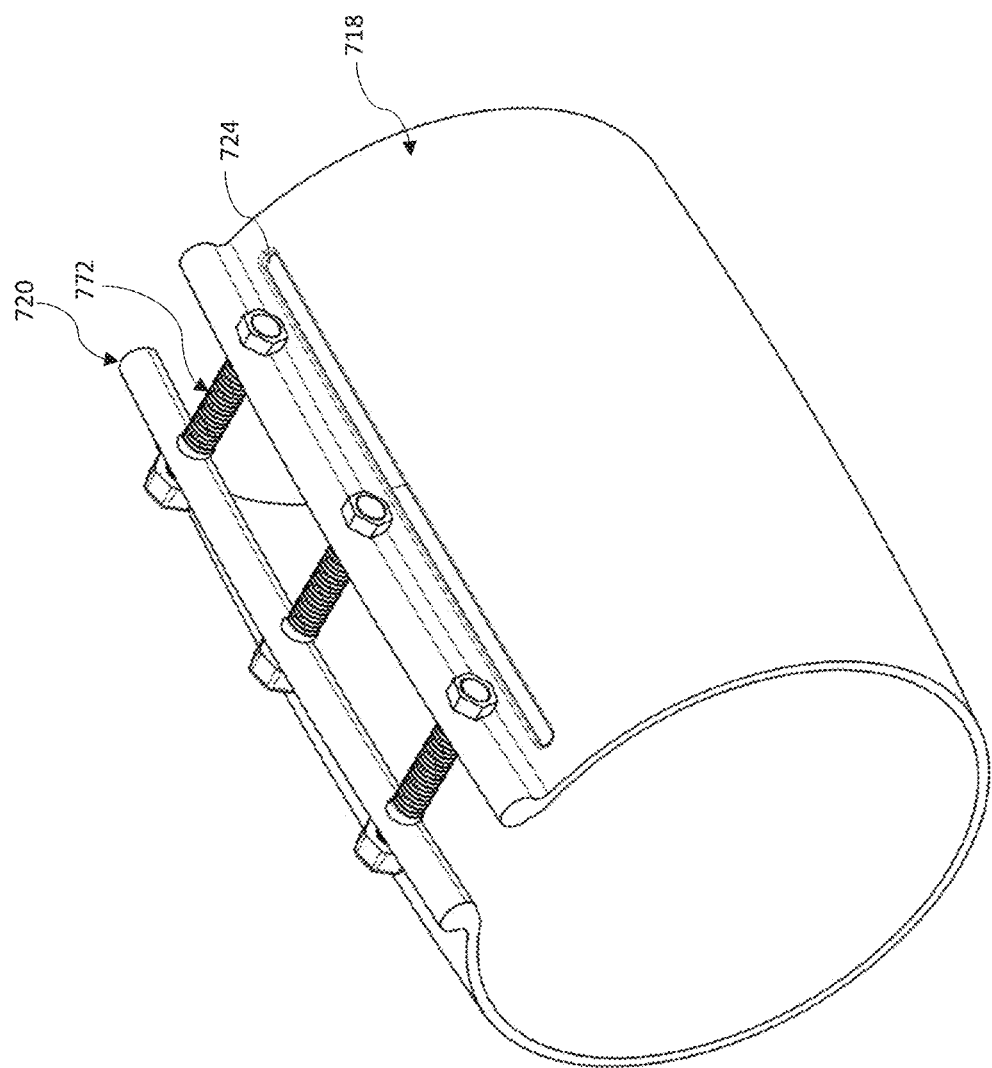

Referring now to an eighth embodiment of the invention as shown in FIG. 22, reference numerals 718 and 720 refer generally to a cover member and a retaining arrangement of a sealing device in accordance with the invention. In this embodiment, the retaining arrangement is in the form of a nut and bolt arrangement 770 for retaining a cover member 718 and with it, a pipe wrapping member (not shown) in position relative a pipe (not shown) in a pipe sealing condition.

Figure 23:
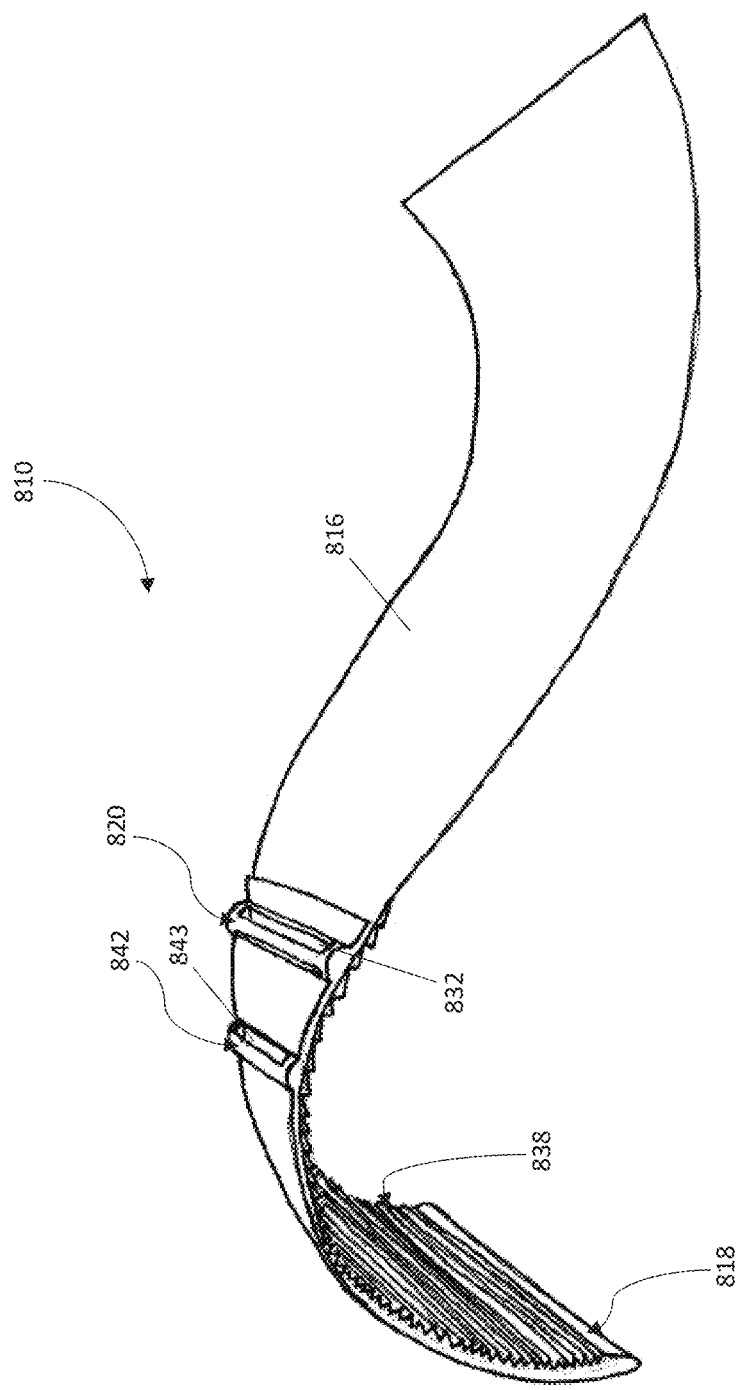
Figure 24:
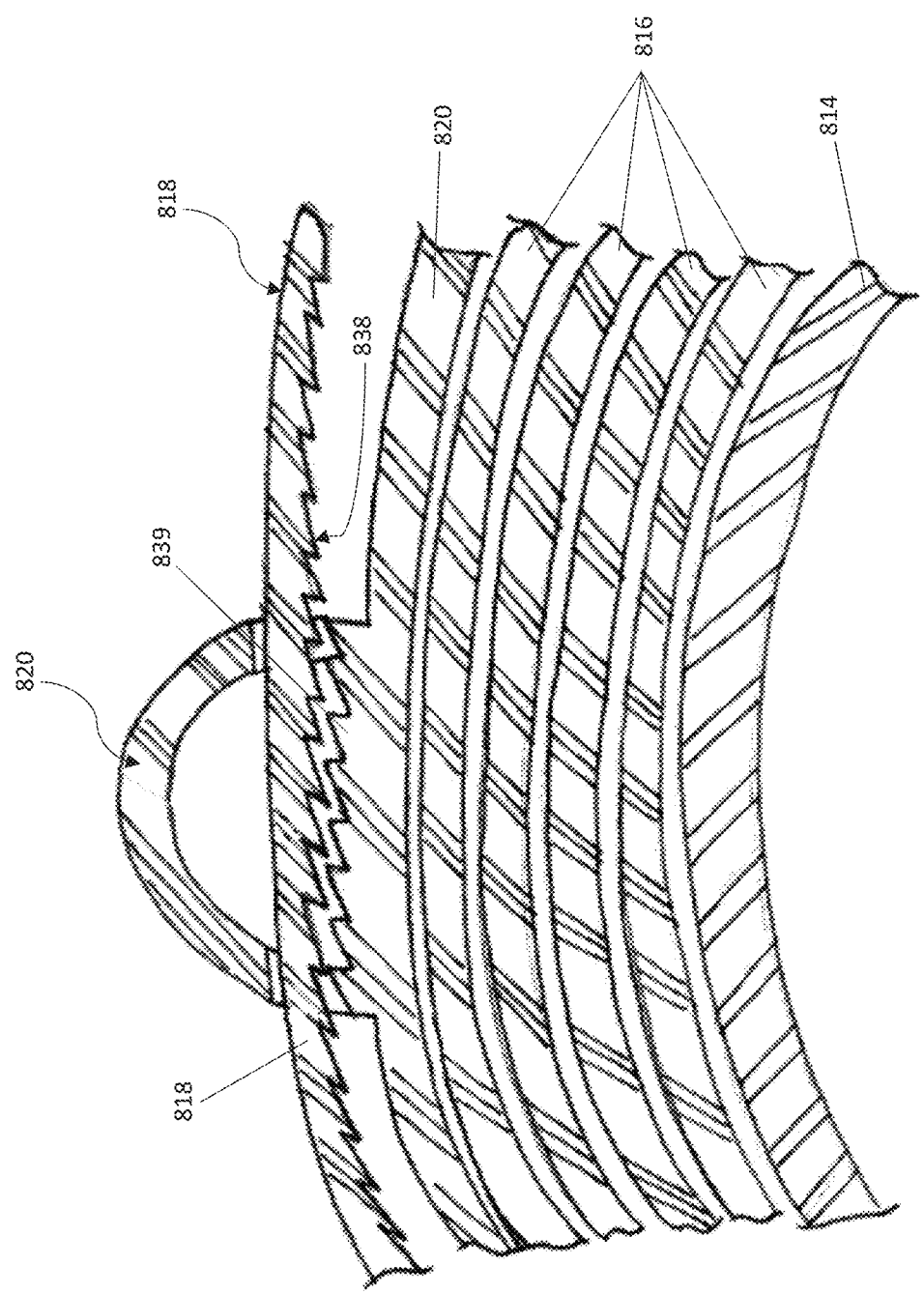

Referring now to a ninth embodiment of the invention, as shown in FIGS. 23 and 24, reference numeral 810 refers generally to sealing device in accordance with the invention, for sealing a leak in a curved portion of a pipe such as an elbow. In this embodiment, retaining arrangements 820 and 842 and a cover member 818 have a width substantially equal to the width of a pipe wrapping member 816.

The pipe wrapping members 16, 216, 316, 416, 516, 616 and 816 are manufactured from a suitable elastic material which includes any one or more of the group consisting of polyurethane, natural rubber, synthetic rubber and latex.

The cover members 18, 118, 218, 318, 418, 518, 618, 718 and 848, and retaining arrangements 20, 120, 220, 320, 420, 520 620, 720 and 820, and 42, 442, 542, 642 and 842 are manufactured from a suitable plastic material which includes any one or more of the group including polypropylene, polycarbonate, polyethylene, silicone, nylon and polyvinyl chloride.

Although only certain embodiments of the invention have been described herein, it will be understood by any person skilled in the art that other modifications, variations, and possibilities of the invention are possible. Such modifications, variations and possibilities are therefore to be considered as falling within the spirit and scope of the invention and hence form part of the invention as herein described and/or exemplified. It is further to be understood that the examples are provided for illustrating the invention further and to assist a person skilled in the art with understanding the invention and is not meant to be construed as unduly limiting the reasonable scope of the invention.

Some embodiments may provide a simple and/or costeffective solution for sealing a leak in a pipe with an elastic material without the need to use additional parts, such as cable ties, to assist in sealing the leak in the pipe. Further, some embodiments may provide an elastic pipe wrapping member that is configured to form to the shape of the pipe thereby ensuring that the leak is covered and sealed.

What is claimed is:

1. A sealing device for sealing a leak in a pipe which includes:
    an elongate pipe wrapping member which is configured to be wrapped around and overlay a leak in a pipe in a wrapped condition;
    a cover member for covering the pipe wrapping member substantially in the wrapped condition;
    a retaining arrangement for retaining the cover member and with it, the pipe wrapping member in position relative the pipe in a pipe sealing condition; and
    a connecting arrangement for allowing interconnection between the pipe wrapping member and the cover member, the connecting arrangement including a receiving portion for receiving the pipe wrapping member complementally therein, the receiving portion being in the form of any one of an elongate pin, channel, slot, aperture, groove, or recess defined in the cover member which is configured to receive and retain an end region of the pipe wrapping member complementally therein so as to allow the receiving portion to be displaceable relative the pipe wrapping member.

2. A sealing device as claimed in claim 1 wherein the receiving portion is sized, shaped and configured to allow displacement of the cover member relative the pipe wrapping member to facilitate substantial overlaying of the pipe wrapping member in the wrapped condition by the cover member.

3. A sealing device as claimed in claim 1 wherein the elongate pin, channel, slot, aperture, groove or recess extends substantially the length of the cover member.

4. A sealing device as claimed in claim 1 wherein the cover member is generally arcuate in cross section so as to correspond with the curvature of the pipe to be sealed.

5. A sealing device as claimed in claim 1 wherein the cover member is sized so as to allow it to overlay the pipe wrapping member in the wrapped condition.

6. A sealing device as claimed in claim 1 wherein the cover member has a width that allows a free end region of the cover member to overlay itself at least partially in the pipe sealing condition.

7. A sealing device as claimed in claim 1 wherein the retaining arrangement is mounted on the cover member.

8. A sealing device as claimed in claim 1 wherein the pipe wrapping member is manufactured from any one or more suitable elastic materials of the group consisting of polyurethane, natural rubber, synthetic rubber and latex.

9. A sealing device as claimed in claim 1 wherein the cover member and retaining arrangement are manufactured from any one or more suitable plastic materials of the group including polypropylene, polycarbonate, polyethylene, silicone, nylon and polyvinyl chloride.

10. A sealing device as claimed in claim 1 wherein a tightening means is provided for tightening the cover member around the pipe wrapping member.

11. A sealing device which includes:
an elongate pipe wrapping member which is configured to be wrapped around and overlay a leak in a pipe in a wrapped condition;
a cover member for covering the pipe wrapping member substantially in the wrapped condition; and
a retaining arrangement for retaining the cover member and with it, the pipe wrapping member in position relative the pipe in a pipe sealing condition, the retaining arrangement including a receiving formation for receiving a free end region of the cover member complementally therein and a retaining formation for retaining the free end region of the cover member in position relative the receiving formation, which retaining formation is in the form of a rack-and-ratchet assembly.

12. A sealing device as claimed in claim 11 wherein the receiving formation is in the form of an elongate slot which is sized, shaped and configured to receive the free end region of the cover member therethrough.

13. A sealing device as claimed in claim 11 wherein the rack-and-ratchet assembly is in the form of teeth which extend from the cover member and inwardly the receiving formation respectively.

14. A sealing device as claimed in claim 11 wherein a release mechanism is provided for allowing the cover member to be released so as to be displaceable relative the receiving formation out of the pipe sealing condition.

15. A sealing device as claimed in claim 11 wherein the pipe wrapping member is manufactured from any one or more suitable elastic materials of the group consisting of polyurethane, natural rubber, synthetic rubber and latex.

16. A sealing device as claimed in claim 11 wherein the cover member and retaining arrangement are manufactured from any one or more suitable plastic materials of the group including polypropylene, polycarbonate, polyethylene, silicone, nylon and polyvinyl chloride.

17. A sealing device which includes:
an elongate pipe wrapping member which is configured to be wrapped around and overlay a leak in a pipe in a wrapped condition;
a cover member for covering the pipe wrapping member substantially in the wrapped condition;
a retaining arrangement for retaining the cover member and with it, the pipe wrapping member in position relative the pipe in a pipe sealing condition; and
a second retaining arrangement for assisting in retaining the overlaying free end region of the cover member in abutment with an overlaid portion of the cover member in the pipe sealing condition.

18. A sealing device as claimed in claim 17 wherein the retaining arrangements are generally arcuate along their longitudinal and transverse axes in accordance with a curved profile defined by the pipe wrapping member in the wrapped condition.

19. A sealing device as claimed in claim 17 wherein the pipe wrapping member is manufactured from any one or more suitable elastic materials of the group consisting of polyurethane, natural rubber, synthetic rubber and latex.

20. A sealing device as claimed in claim 17 wherein the cover member and retaining arrangements are manufactured from any one or more suitable plastic materials of the group including polypropylene, polycarbonate, polyethylene, silicone, nylon and polyvinyl chloride.

* * * * *